United States Patent Office 2,930,813
Patented Mar. 29, 1960

2,930,813

PROCESS FOR THE PREPARATION OF CYCLIC DICARBOXYLIC ACIDS

Walter Schenk, Heidelberg, and Georg Schwarte, Ludwigshafen (Rhine), Germany, assignors to Henkel & Cie. G.m.b.H., Dusseldorf-Holthausen, Germany, a corporation of Germany No Drawing. Application December 6, 1956
Serial No. 626,607

Claims priority, application Germany December 9, 1955

8 Claims. (Cl. 260—515)

This invention relates to a process for producing cyclic carboxylic acids from salts of carboxylic acids other than the one to be produced.

The invention more particularly relates to a process wherein salts of carboxylic acids are caused to undergo a rearrangement to salts of other carboxylic acids, carboxylic acid is liberated from the carboxylic acid salt product by the addition of an acid substance, and the metallic salt ion is recovered by reacting it with a carboxylic acid of the type whose salt was used as the starting material, whereby more of the starting carboxylic acid salt is obtained for rearrangement.

It is known that, by heating salts of cyclic carboxylic acids, salts of other cyclic carboxylic acids can be obtained in which the carboxyl groups are rearranged, i.e. in different positions on the cyclic ring, see for example German Patent No. 936,036 issued December 1, 1955, and United States applications Serial No. 605,702, now U.S. Patent No. 2,823,230, and Serial No. 392,512 now abandoned, owned by the assignee of the present application. Difficulties are entailed in the separation of the resulting dicarboxylic acids from their salts and in the recovery of the metal cation which is combined with the acids in a form suitable for the preparation of further dicarboxylic acid or other salts for use in the rearrangement process.

Heretofore the processing has generally been carried out by liberating the cyclic dicarboxylic acids from their salt solutions with the aid of strong mineral acids, e.g., sulfuric or hydrochloric acid, and separating them from the solution. It was then necessary to recover the metal cation which was combined with the organic acid from the remaining solution, e.g., in the form of sulfate or chloride, and the latter could only be reused for the preparation of the desired acid after reformation of the anionic component into the hydroxide or carbonate followed by reaction with the cyclic carboxylic acid to be employed as starting material.

It is an object of the present invention to provide a method for preparing desired carboxylic acids from other carboxylic acids by a rearrangement of the alkali metal salts at elevated temperatures wherein the desired acid is separated from a reaction mixture of its alkali metal salts, which will not only produce good yields of the pure acid, but will also combine the alkali radical in a form suitable for direct reuse as a starting material in the process.

This and other objects of the present invention will become apparent as the description thereof proceeds.

We have now found that cyclic dicarboxylic acids are obtained in a particularly advantageous manner by treating the salts obtained by the heating of salts of other cyclic carboxylic acids in solution with a substance which liberates the acids, e.g., an acid or acid salt, advantageously in the presence of carbon dioxide, especially under pressure, treating the resulting mixture of solid and liquid, in some cases after the separation of at least a part of the liquid, with the cyclic carboxylic acid, the salt of which has been employed as the starting material or with its acid salts, in some cases with the addition of a solvent, separating the liberated dicarboxylic acid and evaporating the remaining liquid phase, in some cases together with the mentioned liquid which has been separated from the mixture before addition of the carboxylic acid, and again using the dry residue for the preparation of additional dicarboxylic acids.

Examples of cyclic dicarboxylic acids prepared in accordance with this process are aromatic, cycloaliphatic and heterocyclic dicarboxylic acids containing one or more rings e.g., terephthalic, naphthalenedicarboxylic, diphenyldicarboxylic, cyclohexane- or cyclopentanedicarboxylic acids or pyridinedicarboxylic acids. These acids may contain other substituents at the nucleus, e.g., halogen atoms or alkyl groups. Moreover, the term cyclic dicarboxylic acids is understood to include cyclic acids which contain another salt-forming acid group, e.g., a phenolic group, instead of the carboxylic group. Examples of such acids are 4-hydroxybenzoic acid and hydroxynaphthalenecarboxylic acid.

Suitable starting materials for the process are the alkali metal salts, particularly the potassium salts and the thallium-I salts of mono- and polyvalent cyclic carboxylic acids, e.g., benzoic, phthalic, isophthalic, hemimellitic, trimellitic, trimesic, mellophanic, prehnitic, pyromellitic and mellitic acids. Mixtures of salts of benzenecarboxylic acids, e.g., those obtained by oxidizing dialkylbenzenes, particularly crude xylene, with air or nitric acid or by oxidative decomposition of higher ring systems or treatment of carbon-containing substances, e.g., graphite, anthracite, lignite, peat, wood, lignin, coal extract, tars, pitches, coke or asphalt with nitric acid are suitable. Other starting acids which may be used are naphthalic acid, 2-hydroxy-1-naphthalenecarboxylic acid, salicylic acid, diphenic acid, etc.

The preparation of potassium or thallium-I salts of the above mentioned acids may take place in the usual manner, e.g., in solvents by neutralizing the acids with the hydroxides or carbonates of potassium or thallium, or by melting the acids or their anhydrides together with the hydroxides, carbonates or oxalates of potassium or thallium. The presence of excess hydroxide or carbonate in the prepared salts is advantageously avoided, although an excess of potassium or thallium carbonate is not disadvantageous for the subsequent heat treatment of the salts. Furthermore, it is not necessary for the salts employed in neutralizing to be completely free of sodium compounds. Instead of the salts of the starting acid, mixtures of the acids or their anhydrides and the potassium or thallium hydroxides or carbonates may be used, the salt being formed in situ therefrom during the subsequent heat treatment.

The conversion of the salt by heating takes place by the use of the known methods, advantageously in the presence of catalysts and, in some cases, with mixing of the starting material. The heat treatment may also be effected in a rotary tube oven or in a fluidized bed.

Suitable catalysts are, for example, oxides, carbonates, or halides of zinc, cadmium or bivalent iron. Organic salts of these metals, e.g., of the carboxylic acid serving as starting material, are particularly good catalysts.

The temperatures required for the conversion generally lie between 250 and 450° C., advantageously between 350 and 450° C., and preferably between 400 and 420° C. However, lower temperatures are used for the rearrangement of the hydroxycarboxylic acids, so that temperatures of as low as 250–350° C. are adequate. The upper temperature limit should be below the temperature at which substantial decomposition of the starting materials and reaction products takes place.

In the rearrangement of salts of cyclic carboxylic acids obtained by oxidation with nitric acid, e.g., the oxidation product resulting from the action of nitric acid on crude xylenes, it has been found especially advantageous to use small quantities of hydrides or carbides, especially of potassium or sodium. In this way, the decomposition of nitrogen-containing compounds, particularly of cyclic carboxylic acids which contain nitro groups and result as by-products of the oxidation, is substantially facilitated.

The heat treatment may take place at atmospheric or elevated pressure ranging from 1 to 100 atmospheres or more. The pressures are easily obtained by introducing inert gases, especially carbon dioxide or nitrogen. The presence of oxygen or of water during the heat treatment is undesirable, because this causes a drop in yield.

The cyclic dicarboxylic acids are separated from the reaction mixture with transfer of the cations to which they are bonded to new starting acids in such a way that the dicarboxylic acid is liberated in stages. To bring this about, the reaction mixture is dissolved and the solution, in some cases after the filtration of impurities which remain undissolved, e.g., products of carbonization, and possibly of catalysts, is treated with acid substances, especially carbon dioxide, under pressure. Examples of solvents are water, alcohols, such as methanol or ethanol, acetone and ethers, e.g., dioxane or tetrahydrofuran. However, any known organic solvents in which the salts are at least partly soluble may be employed. A particularly advantageous carbon dioxide pressure is one of about 30 atmospheres gauge. The treatment is advantageously conducted at temperatures between $-10°$ C. and the boiling point of the solvent, particularly between $-5$ and $+20°$ C. When carbon dioxide is used in the process, it is especially advisable to operate at lower temperatures, as a result of which the carbon dioxide is more soluble and the work can be conducted at lower pressures. By using the carbon dioxide treatment the free cyclic dicarboxylic acid is obtained in mixture with its acid salts, this involving formation of the bicarbonate of the cation which is linked to the cyclic dicarboxylic acid, e.g., potassium. Both products precipitate, insofar as they are insoluble or difficultly soluble in the solvent. For the purpose of more rapidly attaining equilibrium between the free dicarboxylic acid and its acid salt it is advantageous to add small quantities of the cyclic carboxylic acid acting as starting material to the mixture before or during the carbon dioxide treatment. The amount of acid to be added, which goes into solution in the form of its salts, e.g., as neutral or acid salt, should however be small. It is preferable to add about 0.1 equivalent of the cyclic dicarboxylic acid to be obtained.

The mixture which has been treated with acid substances, such as carbon dioxide, is advantageously freed, at least partly, of liquid preferably under a pressure of carbon dioxide. This may be effected by evaporation of part of the solvent or, in case the acid is present in the form of its acid salt or in the form of a mixture of the free acid and its acid salt, as a precipitate in the mixture treated with carbon dioxide, by filtering and centrifuging, e.g., with the aid of a rotary pressure filter or a centrifugal separator. The separated liquid is extracted, if necessary, for the recovery of dissolved cyclic carboxylic acid, and the extract added to the concentrated mixture. The liquid is advantageously separated to the extent that, after concentration, the content of dicarboxylic acid and its acid salt in the mixture is 20–40 weight percent.

The concentrated mixture is then, preferably after heating to temperatures ranging up to the boiling point, treated with the cyclic carboxylic acid, the salts of which have served as starting material. The acid is advantageously added in an amount that is at least as large as the equivalent amount of dicarboxylic acid to be separated. By adding cyclic carboxylic acid the dicarboxylic acid is liberated from any acid salt remaining in the mixture, while the added acid is converted into its salts. The liberated dicarboxylic acid is separated. When the acid is not readily soluble or is insoluble in the solvent, this may be effected by filtration, decantation, centrifugation, or in other instances, by extraction or precipitation and filtration, or by a suitable combination of these methods of separating. It is easy to determine the most suitable method by means of manual tests.

The remaining liquid phase, i.e., the filtrate or raffinate which contains the salts of the starting acid as well as, in some cases, other carboxylic acids resulting from the reaction, such as benzoic, isophthalic or trimesic acid, is then evaporated. This may, if desired, be carried out jointly with the liquid separated from the mixture before addition of the carboxylic acid. The dry residue is then again used for the preparation of dicarboxylic acid.

In order to recover that portion of catalyst which is separated, together with carbonaceous substances, upon filtering the dissolved salts that are obtained from the rearrangement reaction, the filtration residue is digested with a hot solution of the cyclic carboxylic acid employed as starting material and washed with hot water. The resulting solutions are evaporated for recovery of the catalyst. It is especially advantageous to evaporate these solutions together with the solution of salts of the starting acid obtained after separation of the carboxylic acid to be obtained. The separation of carbonaceous substances from the catalysts retained in the filtration residue may also be effected by extraction with organic solvents, e.g., carbon disulfide.

The following examples are given for the purpose of illustration and to aid persons skilled in the art to carry out our invention, and are not intended to be limitative. The parts given in the examples are parts by weight.

*Example I*

242 parts dry dipotassium phthalate is heated under a carbon dioxide pressure of 22 atmospheres in the presence of cadmium oxide catalyst at 411° C. The resulting mixture of 220 parts dipotassium terephthalate and 21 parts potassium salts of unreacted phthalic acid, benzoic acid and trimesic acid is dissolved in 600 parts water. After filtration from undissolved catalyst and finely-divided carbon, which is formed in the course of the rearrangement reaction and contributes to the clarification of the solution, 13 parts phthalic anhydride is added, with stirring, to the solution which has been cooled to 5° C. Finally 15 atmospheres carbon dioxide is introduced under pressure and intimately mixed with the solution to the point of constant pressure. The temperature is maintained at 5° C. and after about 20 minutes, the liquid partially separated from any precipitated material, with the aid of a centrifugal separator and under $CO_2$ pressure. The solids content of the condensed phase then amounts to about 30 parts by weight/100 parts mixture. The separated, water-clear phase contains mainly dissolved potassium carbonate and potassium salts of phthalic and benzoic acids.

The condensed phase, the solids content of which consists of 51 parts terephthalic acid and 122 parts potassium hydrogen terephthalate, is finally boiled at the boiling point with 122 parts phthalic anhydride until a sample drawn after filtration yields no more terephthalic acid upon acidification with mineral acids. The terephthalic acid is filtered off hot, washed with hot water and dried, yielding 150 parts pure terephthalic acid.

The liquid which is drawn off before addition of phthalic anhydride is combined with the filtrate from the terephthalic acid filtration and evaporated to dryness. A neutral salt mixture consisting mostly of dipotassium phthalate is obtained and is reused in the process to produce further dipotassium terephthalate as described in the first sentence of this example.

Example II

A product prepared from 100 parts crude xylene by oxidation with air or nitric acid under pressure and consisting of 74 parts isophthalic acid, 31 parts terephthalic acid, 12 parts phthalic acid and 11 parts benzoic acid is converted into the neutral potassium salts and, after mixture with 5.5 parts cadmium phthalate catalyst is heated in the dry form, with stirring, for 2 hours in a pressure tube at 415° C. under a $CO_2$ pressure of 25 atmospheres. The product is dissolved in water and the resulting solution filtered.

The filtration residue which contains small amounts of carbonaceous residue is washed with a hot, aqueous solution of the benzenecarboxylic acid mixture to be used for the next rearrangement reaction and then with hot water in order to recover the cadmium compounds. The aqueous extract is evaporated for recovery of the catalyst, as will be described later.

The clear filtrate is subjected, at 10° C., to a carbon dioxide pressure of 14 atmospheres and the pressure is maintained constant. The total amount of terephthalic acid deposits in free form or as potassium hydrogen terephthalate. Both are practically insoluble in water at room temperature under carbon dioxide pressure. They are separated as a moist mass by means of a rotary pressure filter at 3 atmospheres of carbon dioxide pressure. The filtrate contains potassium bicarbonate and a little water-soluble potassium salt of the benzenecarboxylic acids which did not rearrange to form terephthalic acid in the rearrangement reaction, e.g., isophthalic, benzoic and phthalic acid.

The aqueous solids mixture is heated with stirring with a stoichiometric equivalent amount of the benzenecarboxylic acid mixture obtained from xylene oxidation, in order to liberate the residual terephthalic acid, until a sample of hot filtrate no longer forms any precipitate on addition of mineral acids.

The precipitated terephthalic acid is filtered with the use of a rotary pressure filter and washed with hot water. The filtrate is combined with the liquid that has been separated previous to the addition of benzenecarboxylic acid mixture and with the aqueous extract recovered from the catalyst-containing filtration residue. By evaporation of the water there is obtained a mixture of neutral potassium salts of benzenecarboxylic acids which may be directly converted into terephthalic acid, without further addition of catalyst, by renewed heat treatment as described in paragraph one of this example.

110 parts terephthalic acid are obtained after drying in a rotary drier. It can be directly used for esterification without additional purification.

Example III

A mixture of 242 parts dry dipotassium phthalate, which has been prepared in a spray drier and mixed therein with 12 parts iron-II (ferrous) phthalate as catalyst, is heated with stirring for 3 hours at 418° C. under a $CO_2$ pressure of 30 atmospheres. The reaction product is introduced into 800 parts water and filtered at 80° C. from the residue consisting mainly of carbonization products.

When the filtrate has been cooled to about 2° C., carbon dioxide is introduced into it by means of a $CO_2$ injection apparatus under a pressure of 15 atmospheres until the pressure no longer drops. Finally, a solution of potassium bicarbonate together with some potassium benzoate is separated from the mixture, with the use of a nozzle separator, until the mixture still contains about 30 percent by weight of solids. The concentrated mixture containing potassium hydrogen terephthalate, free terephthalic acid, potassium bicarbonate and some potassium benzoate is then treated at a boiling temperature with 130 parts phthalic anhydride until a filtered sample no longer yields any precipitate on addition of mineral acid. The terephthalic acid is separated at the boiling point on a rotary pressure filter, washed with hot water and dried with compressed air. It is obtained in pure, dry form and may be directly esterfied without additional purification.

The clear filtrate resulting from the separation of terephthalic acid and consisting mainly of potassium hydrogen phthalate is combined with the liquid which has been separated in the aforementioned concentration of solids and then evaporated. The dry residue is recycled to the heat rearrangement step for forming terephthalate salts as described in paragraph one of this example.

Example IV

A reaction mixture of 160 parts potassium benzoate and 12.5 parts zinc benzoate catalyst which has been heated for two hours under vacuum at 180° C. to remove residual moisture is heated in an electrically heated pressure container under a carbon dioxide pressure of 30 atmospheres for 4 hours at 420° C. The pressure is then released and the gas mixture fractionally condensed in a receiver. 34 parts benzene resulting from the rearrangement reaction are obtained, while the carbon dioxide is collected and used for carbonic acid precipitation.

When the reaction material has been dissolved in 1000 parts water at the boiling point, the water-insoluble residue consisting essentially of zinc compounds, e.g., zinc carbonate, zinc oxide and some zinc benzoate and carbonaceous decomposition products is filtered and washed with hot water. The filtrate is cooled to 5° C. in a pressure tube in the form of a cooling coil and then treated with carbon dioxide under a pressure of 7 atmospheres with the help of a carbon dioxide injection apparatus. The resulting mixture of acid terephthalate and a little terephthalic acid is continuously separated with a pressure filter. The moist mass containing the acid salt is treated with benzoic acid. When a sample of filtration no longer forms a precipitate on addition of mineral acids at the boiling point, the terephthalic acid is separated, washed repeatedly with water and methanol and dried at 150° C. 75.5 parts terephthalic acid is obtained.

The residue containing water-insoluble carbonaceous materials and zinc compounds and obtained upon dissolving and filtering the reaction product is thoroughly washed with hot, aqueous-methanolic benzoic acid solution, thus causing the zinc compounds to dissolve completely. The aqueous extract is combined with the filtrate obtained on separation of terephthalic acid and evaporated to dryness. The resulting salt mixture of potassium benzoate, which contains the entire zinc content in the form of zinc benzoate, is again subjected, without any further addition of catalyst, to heat treatment for rearrangement into dipotassium terephthalate and benzene as previously described.

Example V

A mixture of 150 parts neutral potassium salt of 4-hydroxybenzoic acid which has been dried under vacuum at 180° C., having been obtained from the rearrangement of a mixture of 156 parts of neutral potassium salt of salicylic acid and 4 grams cadmium oxide by 3 hours heating at 260° C. under a carbon dioxide pressure of 10 atmospheres, is dissolved in 600 parts methanol and separated from insoluble catalyst residue. After cooling the solution to 5° C., carbon dioxide is introduced into a pressure vessel under a pressure of 10 atmospheres to the point of constant pressure. The solids which precipitate and consist essentially of the acid salt of 4-hydroxybenzoic acid are then centrifuged under an atmosphere of carbon dioxide.

The mixture of solids, which still contains potassium bicarbonate, is then dissolved in 150 parts hot water and boiled with 107 parts salicylic acid (containing 1 molecule of water of crystallization). On cooling, a crystalline deposit separates, is filtered and washed with water until a sample dissolved in alcohol no longer yields a violet color on addition of ferric chloride solution. The 4-hydroxybenzoic acid which has been separated and freed of salicylic acid is dried at 90° C., yielding 85 parts.

The acid mixture of solids may also be dissolved in aqueous methanol and acidified with an equivalent amount of salicylic acid. Water is added to the liberated 4-hydroxybenzoic acid, and the latter is extracted with ether. When the ether has been evaporated, the 4-hydroxybenzoic acid is obtained in pure form.

To the filtrate or raffinate from the separation of 4-hydroxybenzoic acid, which contains the salicylic acid constituent mainly in the form of the monopotassium salt, there is added the residue which remains after evaporation of the methanol from the liquid which is centrifuged after the carbon dioxide precipitation. Evaporation of the mixture yields the neutral potassium salt of salicylic acid, which can be reconverted into 4-hydroxybenzoic acid by heat treatment.

While we have given examples of specific embodiments of our invention, it should be understood that the present invention is not limited to these embodiments and that various changes and modifications may be made without departing from the spirit of the invention or the scope of the appended claims.

We claim:

1. In a process for preparing aromatic carboxylic acids, said carboxylic acids containing two acid groups in the 1,4 position on the aromatic nucleus wherein one of said acid groups is a carboxyl group and the other is an acid group selected from the group consisting of carboxyl and phenolic hydroxyl groups, by heating alkali salts of aromatic carboxylic acids which contain acid groups in other than the 1,4 position on the aromatic nucleus wherein one of said acid groups is a carboxyl group and the other is an acid group selected from the group consisting of carboxyl and phenolic hydroxyl groups, under conditions of temperature and pressure under which said salts are converted into alkali metal salts of the carboxylic acids to be prepared, the improvement which comprises separating the acid product and recovering the alkali metal values in a form directly reusable in the process by the steps comprising dissolving the salts obtained from the heat treatment in a solvent selected from the group consisting of water, lower aliphatic alcohols, ketones and ethers, treating said salts in solution with carbon dioxide, separating at least a major part of the liquid from the resulting solids-liquid mixture, treating the resulting solids-liquid mixture with an aromatic carboxylic acid, the salts of which have served as starting materials, and separating the liberated carboxylic acid as a solid from the mixture.

2. In a process for the rearrangement of aromatic carboxylic acids having two acid groups in other than the 1,4-positions on the aromatic nucleus wherein one of said acid groups is a carboxyl group and the other is an acid group selected from the group consisting of carboxyl and phenolic hydroxyl groups, comprising the steps of heating alkali metal salts of said carboxylic acids under conditions of temperature and pressure under which said salts are converted into salts of carboxylic acids, said carboxylic acids containing two acid groups in the 1,4 position on the aromatic nucleus wherein one of said acid groups is a carboxyl group and the other is an acid group selected from the group consisting of carboxyl and phenolic hydroxyl groups, the improvement which comprises separating the acid product and recovering the alkali metal values in a form directly reusable in the process by the steps comprising dissolving the salts obtained on heat treatment in a solvent selected from the group consisting of water, lower aliphatic alcohols, ketones and ethers, treating said salts in solution with carbon dioxide, separating at least a major part of the liquid from the resulting solids-liquid mixture, treating the resulting solids-liquid mixture with an aromatic carboxylic acid the salts of which have served as starting materials, separating the liberated carboxylic acid as a solid from solids-liquid mixture, evaporating the remaining liquid phase to produce a dry salt of the carboxylic acid serving as the starting material for the thermal rearrangement and reusing the dry salt for preparation of carboxylic acids.

3. In a process for preparing aromatic 1,4 dicarboxylic acids by heating alkali metal salts of aromatic dicarboxylic acids having the acid groups in other than the 1,4 position on the aromatic nucleus under conditions of temperature and pressure under which said salts are converted into salts of the 1,4 dicarboxylic acids to be prepared, the improvement which comprises separating the acid product and recovering the alkali metal values in a form directly reusable in the process by the steps comprising dissolving the salts obtained from the heat treatment in a solvent selected from the group consisting of water, lower aliphatic alcohols, ketones and ethers, treating said salts in solution with carbon dioxide to form the acid salts of the 1,4 dicarboxylic acid, separating at least a major part of the liquid from the resulting solids-liquid mixture, treating the resulting solids-liquid mixture with an aromatic dicarboxylic acid, the salts of which have served as starting materials for the initial reaction, separating the liberated dicarboxylic acid as a solid from said solids-liquid mixture, combining the remaining liquid phase together with said liquid separated from said solids-liquid mixture previous to the addition of carboxylic acid, evaporating said combined liquid to produce dry salt of the carboxylic acid serving as the starting material for the thermal rearrangement and using the dry salt for the preparation of dicarboxylic acids.

4. In a process for preparing aromatic 1,4 dicarboxylic acids by heating alkali metal salts of aromatic dicarboxylic acids having the acid groups in other than the 1,4 position on the aromatic nucleus, under conditions of temperature and pressure under which said salts are converted into salts of the 1,4 dicarboxylic acids to be prepared, the improvement which comprises separating the acid product and recovering the alkali metal values in a form directly reusable in the process by the steps comprising dissolving the salts obtained from the heat treatment in a solvent selected from the group consisting of water, lower aliphatic alcohols, ketones and ethers, treating said salts in solution with carbon dioxide to form the acid salt of the 1,4 dicarboxylic acid, separating at least a major part of the liquid from the resulting solids-liquid mixture, treating the resulting solids-liquid mixture with an acid agent selected from the group consisting of the aromatic carboxylic acids, the salts of which have served as starting materials, and their acid salts, separating the liberated dicarboxylic acid as a solid from said solids-liquid mixture, evaporating the remaining liquid phase to form a dry salt of the carboxylic acid serving as the starting material for the thermal rearrangement, and reusing the dry salt for the preparation of dicarboxylic acids.

5. In a process for preparing terephthalic acid by heating alkali metal salts of benzene dicarboxylic acids having the acid groups in other than the 1,4 position on the aromatic nucleus, under a temperature of at least 250° C. and not greater than the temperature at which the starting material will decompose and a pressure of one atmosphere to about 100 atmospheres, in the presence of catalysts containing a metal selected from the group consisting of zinc, cadmium and ferrous iron, under which conditions said salts are converted into salts of the benzene 1,4 dicarboxylic acids to be prepared, the improvement which comprises separating the acid product and recovering the alkali metal values in a form directly reusable in the process by the steps comprising dissolving the salts obtained from the heat treatment in a solvent selected from the group consisting of water, lower aliphatic alcohols, ketones and ethers, treating said salts in solution with carbon dioxide under pressure to form the acid salt of the benzene dicarboylic acid in a resulting solids-liquid mixture, separating under pressure of carbon dioxide at least a major part of the liquid, adding water to said solids-liquid mixture as a solvent, treating said mixture with an acid agent selected from the group consisting of benzene carboxylic acids, the salts of which have served as starting materials and their acid salts, separating the liberated dicarboxylic acid as a solid from said solids-liquid mixture, combining the remaining liquid phase together with said liquid separated from said solids-liquid mixture previous to the addition of carboxylic acid, evaporating said combined liquids, to form a dry salt of the carboxylic acid serving as the starting material for the thermal rearrangement and reusing the dry salt for preparation of dicarboxylic acids.

6. The process according to claim 5, wherein the products obtained by heat treatment of the starting salts are treated with a solvent, separating the resulting residue and treating said residue with solutions of one of the aromatic carboxylic acids which are used as a starting acid for recovery of the catalysts contained therein, freeing said catalysts of liquid, and reusing said catalysts in the rearrangement process.

7. In a process for preparing terephthalic acid by heating salts of dipotassium phthalate at a temperature of at least about 340° C. but not higher than the temperature at which said salts will substantially decompose and under superatmospheric pressures of carbon dioxide in the presence of a cadmium-containing catalyst, whereby the said dipotassium phthalate salts undergo a rearrangement to dipotassium terephthalate, the improvement which comprises separating the acid product and recovering the alkali metal values in a form directly reusable in the process by the steps comprising dissolving the salts obtained from the heat treatment, treating said salts in solution with carbon dioxide, whereby the said dipotassium terephthalate is converted to a mixture of terephthalic acid and its acid salt in a resulting solids-liquid mixture, separating under carbon dioxide pressure at least a major part of the liquid of said solids-liquid mixture, treating the remainder of said solids-liquid mixture with phthalic anhydride, separating the liberated terephthalic acid as a solid from said solids-liquid mixture, combining the remaining liquid phase together with said liquid which has been separated from said solids-liquid mixture previous to the addition of phthalic anhydride, evaporating said combined liquids to obtain a dry residue comprising mainly dipotassium phthalate, and reusing said dry residue for rearrangement by heat treatment into dipotasisum terephthalate.

8. In a process for preparing 4-hydroxy benzoic acid, comprising the steps of heating potassium salts of salicylic acid at a temperature of at least about 250° C. but not higher than the temperature at which said salts will substantially decompose, at super-atmospheric pressure of carbon dioxide in the presence of a cadmium-containing catalyst, whereby the said salts of salicylic acid undergo a rearrangement into the potassium salts of 4-hydroxy benzoic acid, the improvement which comprises separating the acid product and recovering the alkali metal values in a form directly reusable in the process by the steps comprising dissolving said salts obtained from the heat treatment, treating said salts in solution under pressure with carbon dioxide, whereby the 4-hydroxy benzoic acid is liberated in a resulting solids-liquid mixture, separating at least a major part of the liquid from said solids-liquid mixture, treating said mixture with salicylic acid, separating the liberated 4-hydroxy benzoic acid as a solid from the liquid phase, evaporating the said liquid phase from said mixture to obtain a dry residue comprising mainly the potassium salt of salicylic acid and using the said residue to prepare more 4-hydroxy benzoic acid.

References Cited in the file of this patent

UNITED STATES PATENTS

| | | |
|---|---|---|
| 1,937,477 | Mills et al. | Nov. 28, 1933 |
| 2,789,134 | Nelson et al. | Apr. 26, 1957 |

FOREIGN PATENTS

| | | |
|---|---|---|
| 522,829 | Belgium | Oct. 15, 1953 |
| 524,035 | Belgium | Nov. 30, 1953 |